United States Patent [19]
Pravitz et al.

[11] Patent Number: 6,009,324
[45] Date of Patent: Dec. 28, 1999

[54] METHOD AND DEVICE FOR MONITORING A MOBILE TELEPHONE REPEATER

[75] Inventors: Anders Pravitz, Huddinge; Mats Holmgren, Enebyberg, both of Sweden

[73] Assignee: Allgon AB, Akersberga, Sweden

[21] Appl. No.: 08/796,691

[22] Filed: Mar. 4, 1997

[30] Foreign Application Priority Data

Mar. 4, 1996 [SE] Sweden .................................. 9600842

[51] Int. Cl.⁶ .................................................. H04Q 7/20
[52] U.S. Cl. .......................................... 455/423; 455/571
[58] Field of Search .................... 455/571, 523, 455/15, 16, 17, 423

[56] References Cited

U.S. PATENT DOCUMENTS

| | | | |
|---|---|---|---|
| 4,776,032 | 10/1988 | Odate et al. | 455/24 |
| 5,095,528 | 3/1992 | Leslie et al. | 455/15 |
| 5,115,514 | 5/1992 | Leslie | 455/9 |
| 5,450,620 | 9/1995 | Vaisanen | 455/127 |
| 5,551,067 | 8/1996 | Hulkko et al. | 455/127 |
| 5,812,933 | 9/1998 | Niki | 455/16 |

FOREIGN PATENT DOCUMENTS 0605182  7/1994  European Pat. Off. .

OTHER PUBLICATIONS

Patent Abstracts of Japan, Abstract of JP,A,63–79429 (Nippon Telegr & Telph Corp.), Apr. 9, 1988.

Patent Abstracts of Japan, Abstract of JP,A,1–62926 (Nippon Telegr & Teleph Corp.), Mar. 9, 1989.

*Primary Examiner*—William G. Trost
*Assistant Examiner*—Myron K. Wyche
*Attorney, Agent, or Firm*—Jacobson, Price, Holman & Stern, PLLC

[57] ABSTRACT

A method and device for monitoring a mobile telephone repeater are disclosed. The repeater is of the kind comprising an uplink (100) and a downlink (200) between two antennas (1, 2), wherein the repeater receives, amplifies and retransmits signals between a base station and a mobile telephone. A stability test is performed automatically, whereby a possible continuous and strong signal, being caused either by an instability involving a positive feedback between the two antennas or by a disturbing signal, is detected, whereupon the amplifying gain is adjusted in response to the result of the stability test. The test criterion includes the step of checking whether the level of the input signal in the respective amplifier chain exceeds a threshold value during at least a major portion of a measuring period.

20 Claims, 2 Drawing Sheets

METHOD AND DEVICE FOR MONITORING A MOBILE TELEPHONE REPEATER

BACKGROUND OF THE INVENTION

1. Field of the Invention

The present invention concerns a method and a device for monitoring a mobile telephone repeater of the kind having two antennas and two links therebetween, said two links comprising an uplink for amplifying signals from a mobile telephone to a base station and a downlink for amplifying signals from said base station to said mobile telephone, said two links being provided with a number of amplifier chains each being designed to pass through a specific signal frequency channel or frequency band, wherein a possible continuous and strong signal, being caused either by an instability involving a positive feed back between said two antennas or by a disturbing signal, is detected by applying a test criterion which includes measuring a signal level and checking whether the measured signal level exceeds a threshold value, whereupon an amplifying gain in the respective amplifier chain is adjusted in response to the result of the stability test.

2. Description of the Related Art

A repeater for use in cellular telephone systems is a device which amplifies a received RF-signal and retransmits the amplified signal at the same carrier frequency. Accordingly, there is a risk that the signal retransmitted from one antenna is picked up by the other antenna so as to cause a positive feedback and a strong self-oscillating signal which is maintained by the amplifiers in the particular amplifier chain.

If the downlink oscillates, the area to be covered by the repeater may be disturbed so as to make the mobile telephones in this area inoperative. On the other hand, if the uplink oscillates, the associated base station will receive a continuous, strong signal which blocks the receiver of the base station and prevents it from functioning properly.

SUMMARY OF THE INVENTION

Therefore, great care must be observed when mounting the two antennas of the repeater, so that the isolation therebetween becomes sufficient.

The amplifying gain in the respective amplifier chain has to be selected in view of several factors, primarily the signal strength of the transmission from the base station. However, it is difficult to measure the isolation between the antennas of the repeater or to check it upon making changes, such as updating various parameters.

Furthermore, the isolation between the antennas is not constant but will generally depend on a changing environment, such as varying weather conditions, large metal objects being moved, etc.

Accordingly, there is a need for an automatic and preferably continuous monitoring of the stability in order to avoid self-oscillation or retransmission of other strong, continuous signals.

A method and a device, as defined in the first paragraph above, are known from the document U.S. Pat. No. 5,095,528, which discloses a repeater being designed to limit the transmitter output power when a mobile unit approaches the repeater. This is achieved by monitoring the output power level of the repeater and adjusting the gain in response thereto. Thus, when the output power level exceeds a predetermined threshold, the gain is reduced, possibly in several steps, until the output power level falls below the threshold.

However, the known method and device do not solve the instability problem in case of a repeater operating with signals originating from several different mobile units, at least not in optimal way, since the threshold value will often be reached momentarily and the gain will therefore be reduced to an unnecessarily low value.

The object of the present invention is to provide a method and a device for carrying out a stability test so as to control the amplifying gain of each amplifier chain and to maintain the operability of the repeater.

BRIEF DESCRIPTION OF THE DRAWINGS

The invention will now be described more fully with reference to the appended drawings illustrating a preferred embodiment.

DETAILED DESCRIPTION OF THE PREFERRED EMBODIMENTS

Figure 1:
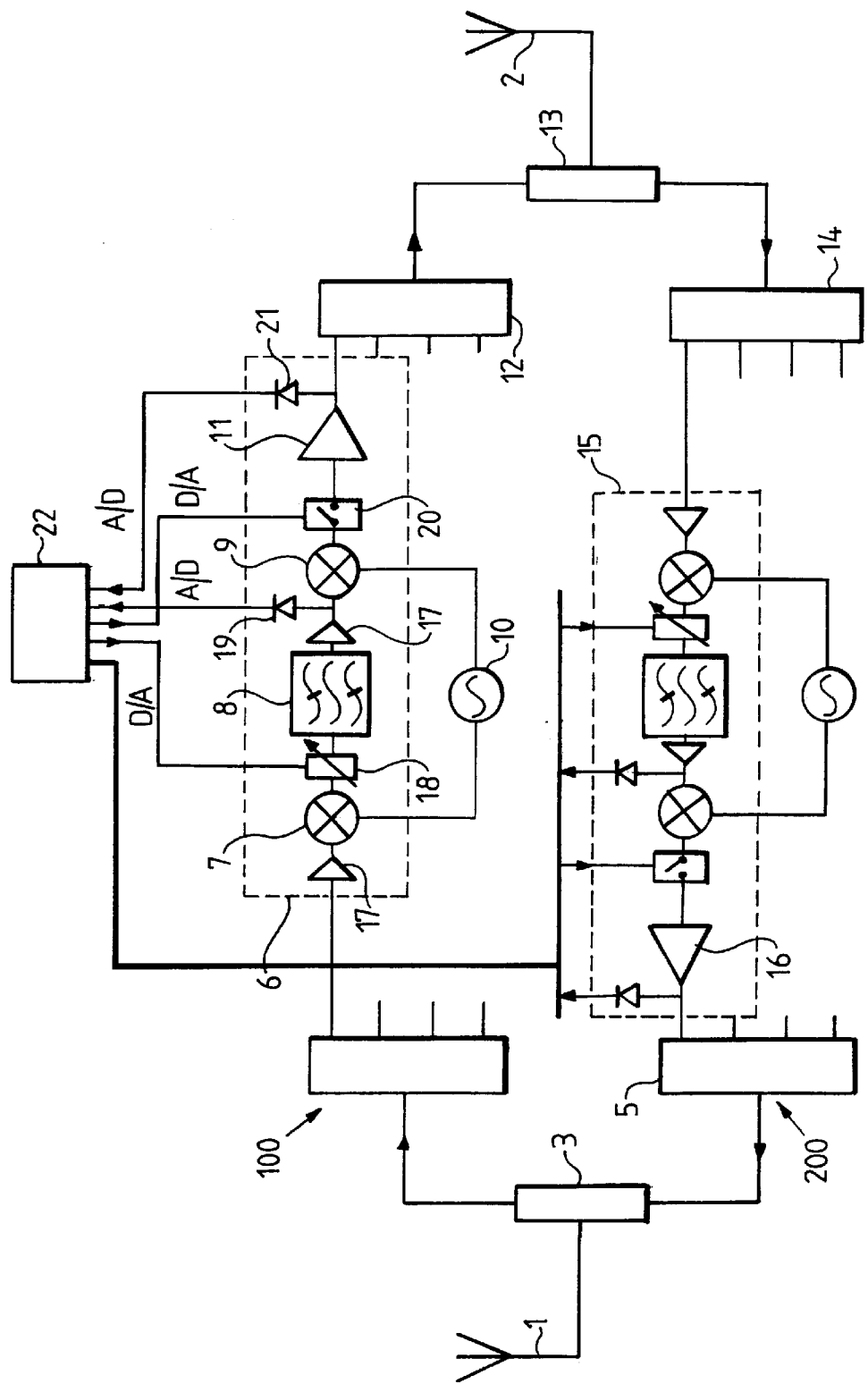
FIG. 1 is a block diagram of a repeater provided with a monitoring device according to the invention.

The repeater shown in FIG. 1 is basically of the kind disclosed in the document WO95/31866. It comprises a first antenna 1 for radio communication between the repeater and a cellular mobile telephone (not shown) and a second antenna 2 for a corresponding radio communication between the repeater and a base station (not shown). The RF-signals received by the first antenna 1 are retransmitted, after amplification, by the second antenna 2 at the same (first) carrier frequency. Likewise, the RF-signals received by the second antenna 2 are retransmitted from the first antenna 1 at the same (second) carrier frequency.

The first and second antennas 1 are connected via duplex filters 3, 13 to two oppositely directed links, namely an uplink 100 for transferring signals originating from mobile telephones towards the associated base station, and a downlink 200 for transferring signals in the opposite direction.

In the uplink 100, the signals received by the first antenna 1 are fed through the duplex filter 3 to a multicoupler amplifier 4, which distributes the signals into a number of parallel amplifier chains 6, and further via a combiner 12 and the duplex filter 13 to the second antenna 2. Correspondingly, in the downlink, the signals are fed from the second antenna 2 through the duplex filter 13, a multicoupler amplifier 14, a number of parallel amplifier chains 15, a combiner 5, and further via the duplex filter 3 to the first antenna 1.

Each amplifier chain 6 and 15, respectively, is designed to pass through a specific frequency channel and includes a first mixer 7, a local oscillator 10, a filter 8, a second mixer 9, a number of amplifiers 17 (two of them in the shown example), a controllable attenuator 18 at the input side of the filter 8, a diode detector 19 for measuring the input signal level in the chain 6, a switching device 20 for strongly attenuating the signal through the chain in certain situations, an output power amplifier 11 and a diode detector 21 for measuring the power level at the output of the power amplifier 11.

The diode detectors 19, 21 are connected via A/D converters to a control unit 22, including a digital processor, which is also coupled to the attenuator 18 and the switching device 20 via D/A converters. As shown in FIG. 1, the control unit 22 is connected to corresponding components in the respective downlink amplifier chains 15. In this way, the input signal level and the output power level can be measured in each amplifier chain 6, 15, and the amplifying gain can be controlled by means of the respective attenuator 18. The oscillator 10 is also controllable, and the switching device 20 is used to block the frequency channel temporarily when checking a possible state of instability of the repeater or durably in the presence of a continuous disturbing signal.

The control unit 22 is programmed to perform certain tests and to make adjustments in response to the test results. Preferably, it is connected to an operation and monitoring centre (not shown) via a telephone modem so as to enable a continuous supervision of the repeater, a remote control of its operation and updating of various parameters.

The control unit 22 also includes two counters. A first counter (not shown specifically) measures the proportional time during which the input signal level, sensed by the detector 19, exceeds a threshold value, e.g. −70 dBm, during a measuring period. A second counter measures basically the same proportional time, although expressed as the number of GSM time slots (1–8) during which the signal level exceeds the threshold.

The detector 19 also registers the maximum and minimum level values being sensed during the measuring period, which is 2 seconds in the present example. Similarly, the detector 21 also registers the maximum output power level being sensed during the measuring period.

Figure 2:
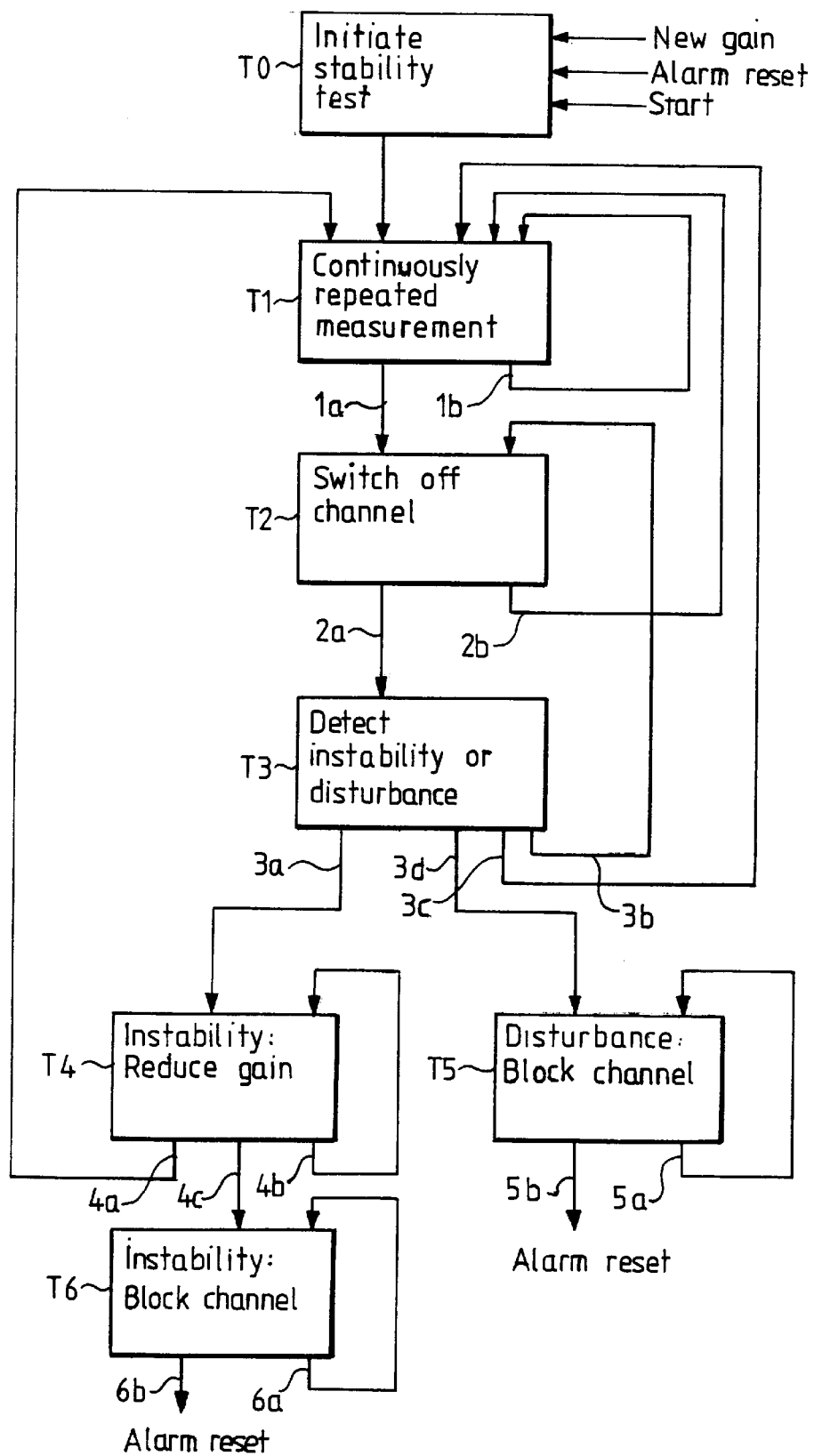
FIG. 2 is a schematic flow diagram illustrating the monitoring method according to the invention.

The stability test and monitoring procedure will now be described with reference to the flow diagram in FIG. 2. It is assumed that the measurements are carried out in the uplink chain 6, whereas any adjustments made in response to the test results are effected in the respective uplink chain 6 as well as in the respective downlink chains 15, whereby a good balance is achieved.

When starting the operation of the repeater or when resuming the operation upon an alarm reset, upon a power failure or upon updating parameters, a stability test is initiated (T0, FIG. 2) in each one of the amplifier chains 6 of the uplink 100. First, the amplifying gain is temporarily increased, by means of the respective attenuator 18, to a gain value which exceeds a selected normal gain value by a relatively large value, viz. a stability margin value, which is typically 10–20 dB, in particular 13 dB, chosen so as to create a sufficient margin for the isolation of the two antennas 1, 2.

Then, certain measurements (T1) are carried out repeatedly in order to establish whether the particular frequency channel is stable and operative, or if there is an instability, involving a self-oscillation with positive feedback between the two antennas, or a continuous, disturbing signal which must be suppressed.

The measurement period is about 2 seconds, and the following variables are measured in each amplifier chain 6:
- the maximum and minimum values of the input signal level, as sensed by the detector 19;
- the proportional time in which the input signal level exceeds a threshold value, e.g. −70 dBm, as registered by the first or second time counter; and
- the output power level as sensed by the detector 21.

Now, the digital processor in the control unit 22 applies a test criterion for the detection of an instability or a disturbance. The criterion is met if:
- the input signal level exceeds the threshold value during at least 90%, in particular 97%, of the measuring period;
- the output power exceeds 27 dBm; and
- the difference between the maximum and minimum input signal levels, for different time slots, is less than 10 dB.

In case the test criterion is not fulfilled, i.e. if at least one of the above three partial criteria is not met, the measurement is repeated several times (numeral 1b) and, after about 30 seconds, provided that the test result has not changed, the amplifying gain is adjusted to the selected normal value and the repeater starts to operate normally while being monitored by continuously repeated measurements (T1).

On the other hand, in case the test criterion indicates a possible instability or a disturbing signal (numeral 1a), the threshold value for the input signal level is increased to a value lying 5 dB below the measured maximum value, and the switching device 20 is activated so that the channel is cut off (T2). Thus, a self-oscillating signal or a disturbing signal is confirmed upon repeating the measurement at least five times (numeral 2b and 2a).

Upon detection of an instability (T3), involving a self-oscillation in this particular chain 6 and being confirmed by sensing an input signal which is no longer continuous when the channel is cut off (numerals 3a, 3b and 3c), the amplifying gain is reduced (T4) step by step, 1 dB in each step (numeral 4b), until the instability has ceased (numeral 4a). Then, the amplifying gain is reduced by the margine value, e.g. 13 dB, so that the repeater will operate with a sufficient instability margin, the amplifying gain then being kept at a reduced level. Furthermore, an instability alarm signal is sent via the control unit 22 to the operation and monitoring centre.

Thereupon, for each amplifier chain where an instability has been detected, a further stability test is made every 60 minutes, the amplifying gains then being temporarily increased by 13 dB each time. In case there is no instability in spite of the increased gain, the amplifying gain is then reduced to the selected normal gain value. An instability alarm ceasing signal is sent to the operation and monitoring centre.

Upon detection of a continuous, strong disturbing signal (T3), being confirmed by the detector 19 in spite of the cut off channel, such a signal is classified as a continuous disturbing signal (numeral 3d) and a corresponding disturbance alarm signal is sent to the operation and monitoring centre. Then, the particular channel is blocked (T5) so as to avoid the retransmission of a disturbing signal to the associated base station. Only when the disturbing signal is no longer sensed by the detector 19 will the alarm be reset (5b) and the stability test be initiated again (T0).

In some cases, upon detecting an instability (T3, T4), the amplifying gain has to be reduced (numeral 4b) until a minimal gain is obtained (numeral 4c). If so, the particular channel is blocked (T6) by means of the switching device 20 until the instability has ceased, or the alarm is reset (6b), whereupon the stability test is initiated again (T0).

The method described above may be modified within the scope of the claims. For example, is may be sufficient to measure the input signal level and to dispense with the power level sensor 21 and the switching device 20. Then, the attenuator 18 is used for controlling the amplifier gain and to cut off the channel when an instability has been detected.

The block diagram in FIG. 1 is schematic and does not show all components in detail. Every amplifier chain 6, 15 includes several amplifiers, attenuators and other components, not necessarily in the order as shown in FIG. 1.

The particular signal levels, margine values, time durations, etc. mentioned above may of course vary with the detailed design of the repeater. Furthermore, each amplifier chain 6, 15 may be designed to pass through a particular frequency band rather than a specific frequency.

What is claimed is:

1. A method of monitoring a mobile telephone repeater of the kind having two antennas and two links therebetween, said two links comprising an uplink for amplifying signals from a mobile telephone to a base station and a downlink for amplifying signals from said base station to said mobile telephone, said two links being provided with a number of amplifier chains each being designed to pass through a specific signal frequency channel or frequency band, a stability test being performed for each amplifier chain in one of said two links, wherein a possible continuous and strong signal, being caused either by an instability involving a positive feed back between said two antennas or by a disturbing signal, is detected by applying a test criterion which includes measuring a signal level and checking whether the measured signal level exceeds a threshold value, whereupon an amplifying gain in the respective amplifier chain is adjusted in response to the result of the stability test, wherein the test criterion further comprises the step of measuring the proportional time during which the input signal level exceeds a threshold value during a measuring period and checking whether said proportional time exceeds a major predetermined portion of said measuring period.

2. The method as defined in claim 1, wherein said test criterion also includes measuring the output power level from the respective amplifier chain and checking whether the measured output power level exceeds a predetermined value.

3. The method as defined in claim 1, wherein said test criterion also includes checking whether the difference between the maximum and minimum values of said input signal level, as measured during said measuring period, is less than a set value.

4. The method as defined in claim 1, wherein said test criterion includes checking whether all of the following three conditions are met:

the input signal level exceeds the threshold value during at least a major portion of the measuring period;

the output power level exceeds a predetermined value; and the difference between the maximum and minimum values of said input signal level, as measured during said measuring period, is less than a set value;

and, in case at least one of the above three conditions is not met, the measurement is repeated several times.

5. The method as defined in any one of claims 1, wherein, when said test criterion is met, the signal in said respective amplifier chain is strongly attenuated, whereupon a new measurement is made to determine whether the signal is caused by an instability, in which case the strong signal disappears, or by a disturbing signal, in which case the strong signal is maintained.

6. The method as defined in claim 5, wherein, when said test criterion is met, said threshold value is adjusted to a higher value before said new measurement is made.

7. The method as defined in claim 6, wherein said higher value lies a predetermined distance below the previously measured maximum value of said input signal level.

8. The method as defined in claim 1, wherein the power and signal level measurements are consecutively repeated a predetermined number of times within a test period.

9. The method as defined in claim 1, wherein, in case said test criterion is not met and thus an instability has not been detected, the amplifying gain in the respective amplifier chain is adjusted to a predetermined normal operational gain.

10. The method as defined in claim 1, wherein the stability test is performed when starting the operation of the repeater or when resuming the operation of the repeater upon updating the same or resetting the same after a power failure, wherein said amplifying gain is temporarily increased by a stability margin value during said measuring period.

11. The method as defined in claim 10, wherein, in case an instability has been detected, the amplifying gain is reduced step by step and, when the instability has ceased, the amplifying gain is reduced by said stability margin value down to a reduced operational gain value.

12. The method as defined in claim 11, wherein the stability test is performed automatically at regular intervals during normal operation of the repeater.

13. The method as defined in claim 12, wherein, at said regular intervals, the amplifying gain is temporarily increased by said stability margin value, whereupon the stability test is performed and the amplifying gain is adjusted accordingly.

14. The method as defined in claim 1, wherein the amplifying gain being adjusted in each amplifier chain of said one link is adjusted correspondingly in each amplifier chain of the other link.

15. The method as defined in claim 1, wherein the stability test is performed in said uplink.

16. A device for monitoring a mobile telephone repeater of the kind having two antennas and two links therebetween, said two links comprising an uplink for amplifying signals from a mobile telephone to a base station and a downlink for amplifying signals from said base station to said mobile telephone, said two links being provided with a number of amplifier chains each being designed to pass through a specific signal frequency channel or frequency band and each having a frequency filter and an output power amplifier, the device comprising a sensing device for sensing the input signal level in a respective amplifier chain, and a control unit for controlling the amplifying gain in the respective amplifier chain, the device further comprises a means for measuring the proportional time during which the input signal level, sensed by said sensing device, exceeds a threshold value during a measuring period.

17. The monitoring device as defined in claim 16, wherein each amplifier chain comprises a controllable attenuator for controlling the amplifying gain in said amplifier chain.

18. The monitoring device as defined in claim 16, comprising a power sensing device for sensing the power level at the output of said output power amplifier in said amplifier chain, said power sensing device being connected to said control unit.

19. The monitoring device as defined in claim 18, comprising a switching device inserted in said amplifier chain at the output side of said input signal level sensing device, said switching device being connected to said control unit and being adapted to either pass through or block the output signal in said amplifier chain.

20. The monitoring device as defined in claim 16, wherein said control unit comprises a digital processor being programmed to perform a stability test.

* * * * *